US005360307A

United States Patent [19]
Schemm et al.

[11] Patent Number: 5,360,307
[45] Date of Patent: Nov. 1, 1994

[54] BATTERY TRANSFER TECHNIQUE FOR VEHICLE

[75] Inventors: Jerry D. Schemm, Arvada; Bryon L. Kajfosz, Aurora; Richard T. Krieger, II, Denver, all of Colo.

[73] Assignee: Windsor Industries, Englewood, Colo.

[21] Appl. No.: 986,471

[22] Filed: Dec. 7, 1992

[51] Int. Cl.⁵ .............................................. B60K 1/04
[52] U.S. Cl. ...................................... 414/343; 414/786; 414/401; 414/345; 104/34; 180/68.5; 320/2
[58] Field of Search ............... 414/786, 340, 343, 344, 414/345, 349, 352, 353, 400, 390, 395, 396, 401, 402; 320/2; 104/34; 180/68.5

[56] References Cited

U.S. PATENT DOCUMENTS

| | | |
|---|---|---|
| 384,562 | 6/1888 | Condict . |
| 417,259 | 12/1889 | Main . |
| 1,165,784 | 12/1915 | Klingelsmith . |
| 1,566,089 | 12/1925 | Handing . |
| 2,007,778 | 7/1935 | Swanson . |
| 3,649,953 | 3/1972 | Hoffman . |
| 3,782,750 | 1/1974 | Peters . |
| 3,847,242 | 11/1974 | Kappei . |
| 3,876,086 | 4/1975 | Kappei . |
| 3,930,552 | 1/1976 | Kunkle et al. . |
| 4,450,400 | 5/1984 | Gwyn ............... 104/34 X |
| 4,496,274 | 1/1985 | Pipes ............... 104/34 X |
| 4,808,058 | 2/1989 | Carney et al. . |
| 5,036,938 | 8/1991 | Blount et al. . |

FOREIGN PATENT DOCUMENTS

| | | | |
|---|---|---|---|
| 24163 | 11/1930 | Australia ............... 414/401 |
| 1044688 | 4/1951 | France . |
| 1007857 | 5/1957 | Germany . |
| 1066143 | 9/1959 | Germany ............... 414/344 |
| 2214647 | 9/1973 | Germany ............... 414/401 |
| 2422960 | 11/1975 | Germany ............... 104/34 |
| 292957 | 2/1932 | Italy ............... 414/345 |
| 81874 | 5/1984 | Japan ............... 320/2 |
| 2174657 | 11/1986 | United Kingdom ............... 104/34 |

OTHER PUBLICATIONS

Brochure, "The Clarke CFS 2700 Self Propelled, Self-Contained Battery Operated Carpet Extractor".

Primary Examiner—Frank E. Werner
Attorney, Agent, or Firm—John R. Ley; Carol W. Burton

[57] ABSTRACT

A battery pack is effectively transferred between a battery powered vehicle and a cart in order to replace the battery pack with a freshly charged pack. The transfer is facilitated without dropping the battery pack by using a locking mechanism which is operative between a tray which supports the battery pack and a cart upon which the battery pack is transported to the vehicle. The locking mechanism holds the tray in place on the cart until the transfer occurs. The locking mechanism is also operative between the vehicle and the tray to hold the tray and battery pack in place on the vehicle. In order to release the tray from either the cart or the vehicle manual action is required. An attachment mechanism automatically attaches the cart to the vehicle during the transfer to prevent the battery pack from dropping due to unanticipated movement of the cart relative to the vehicle. The attachment of the cart to the vehicle is established upon positioning of the cart in the transfer position. In order to release the attachment of the cart and the vehicle manual action is again required. The methodology of the transfer is also described.

25 Claims, 5 Drawing Sheets

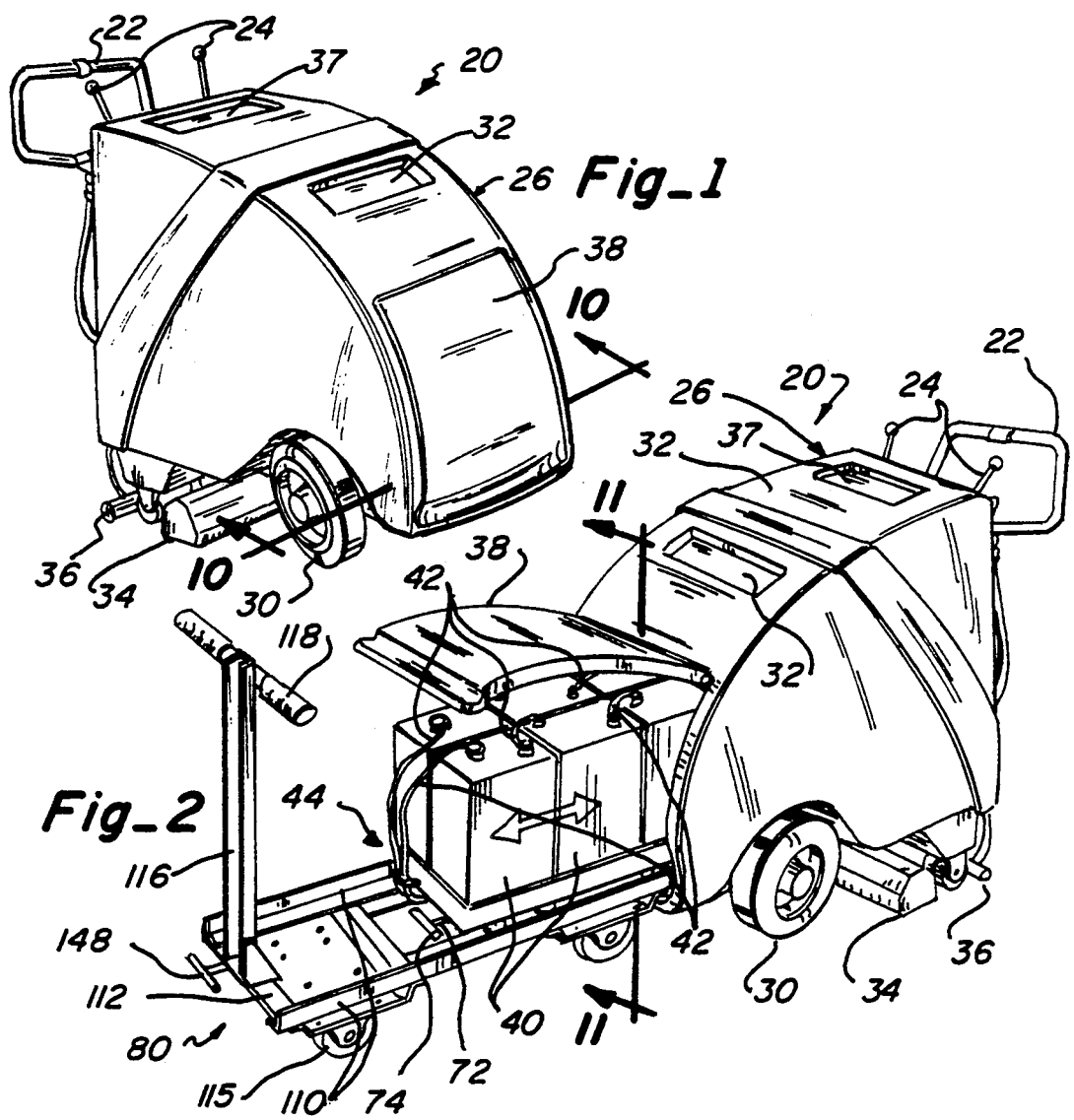
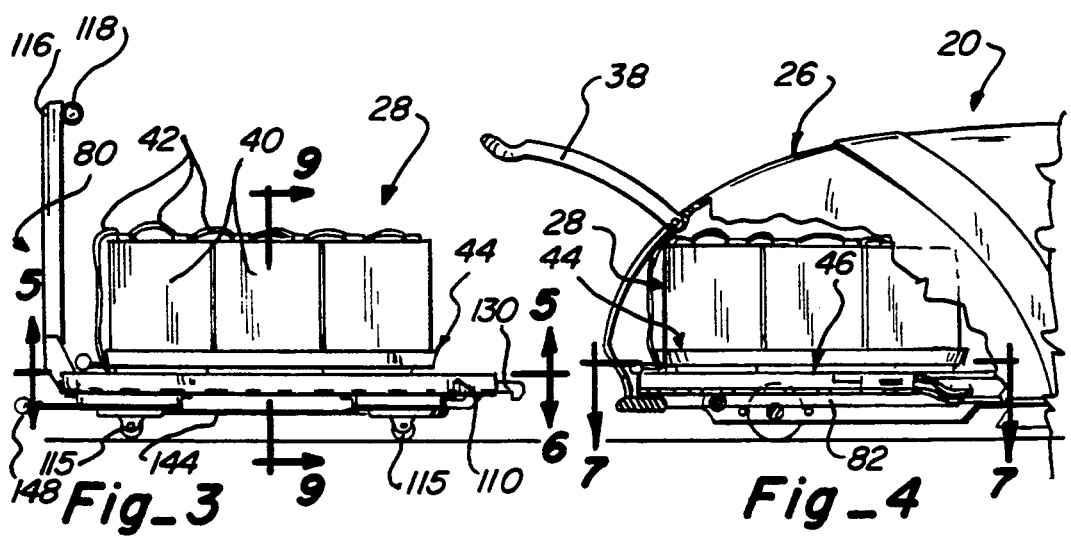

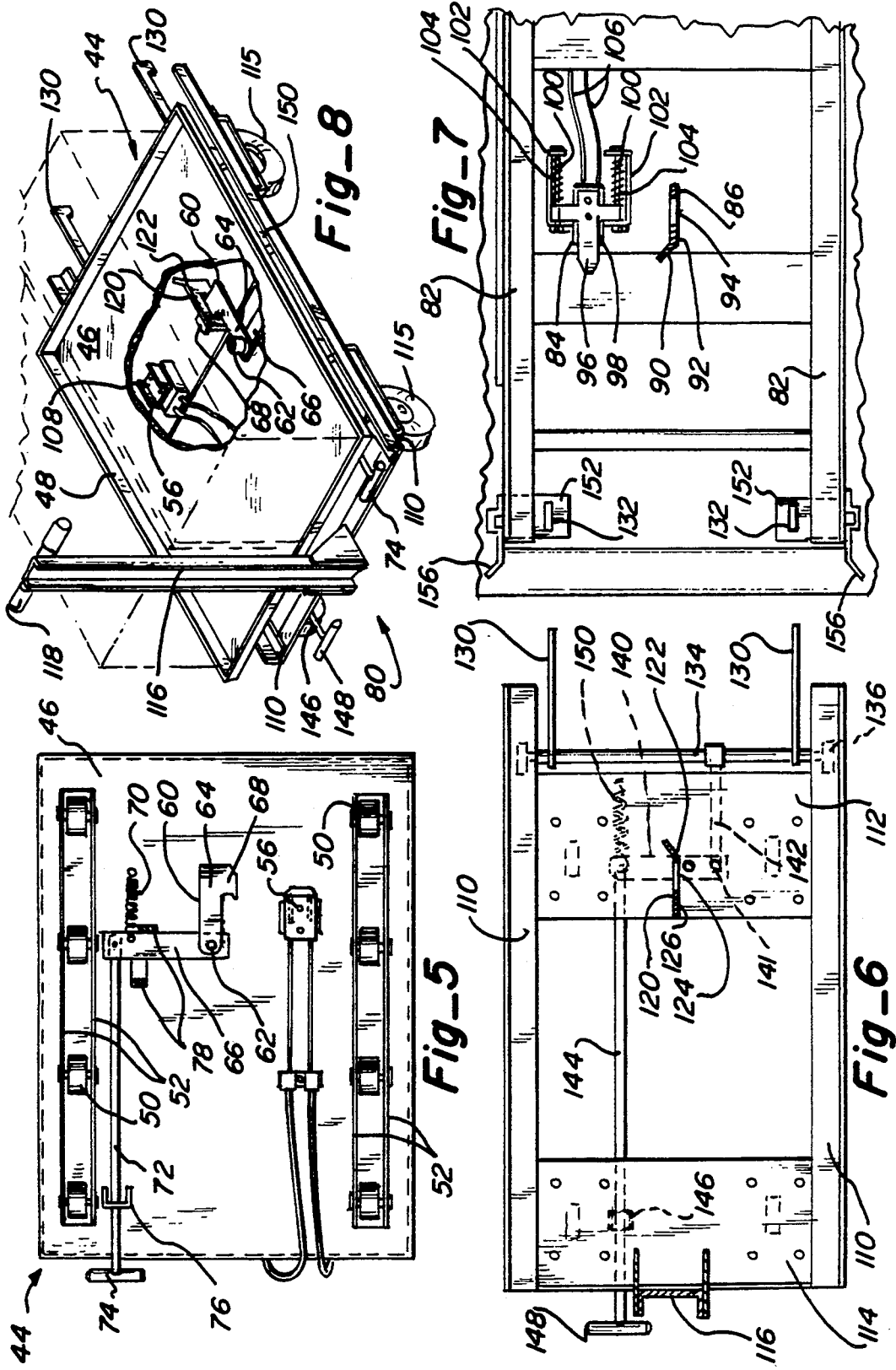

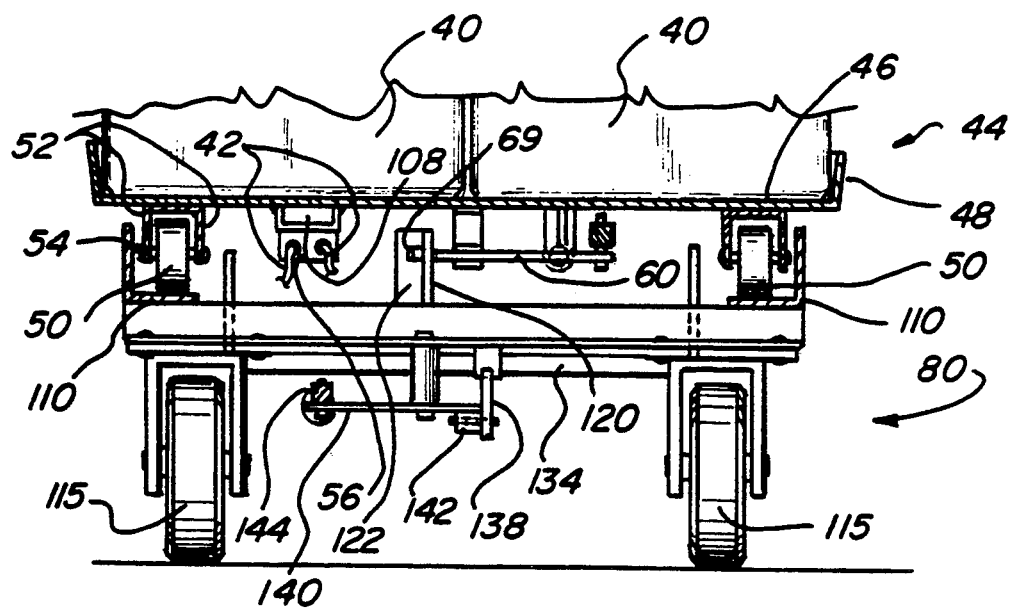
Fig_9
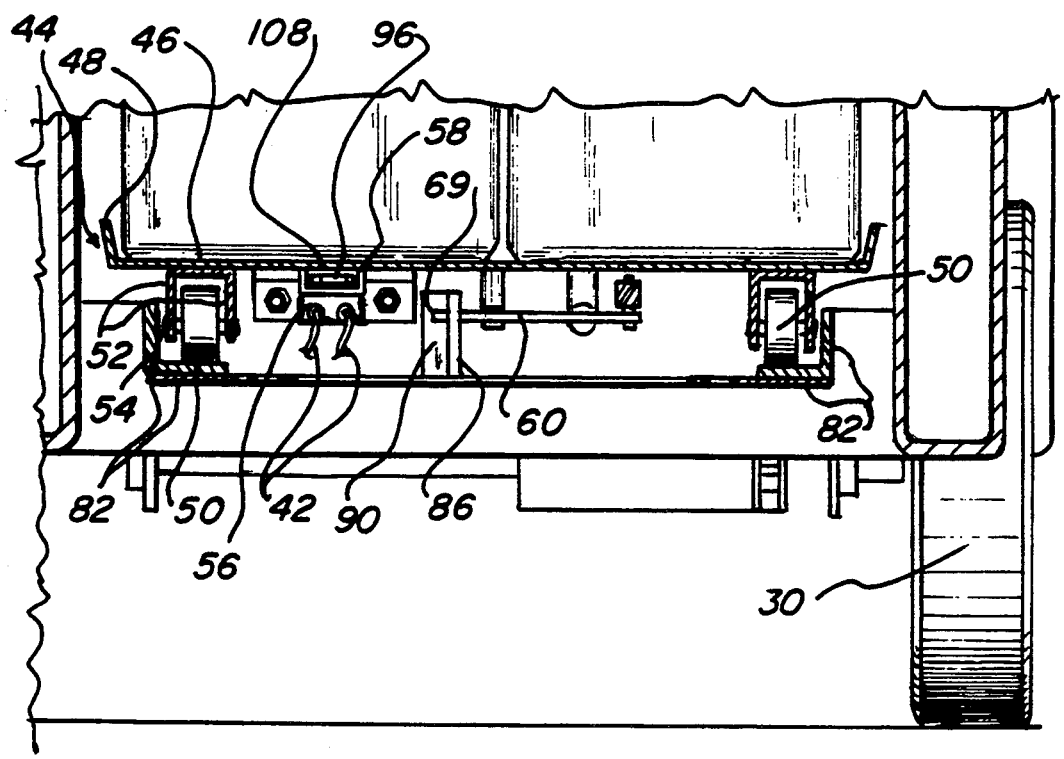
Fig_10

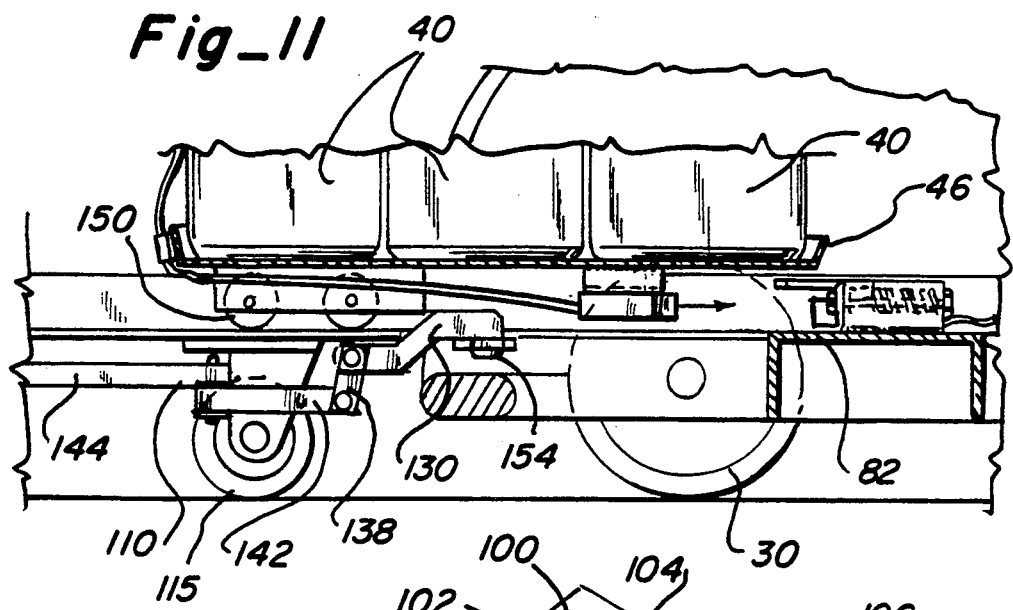
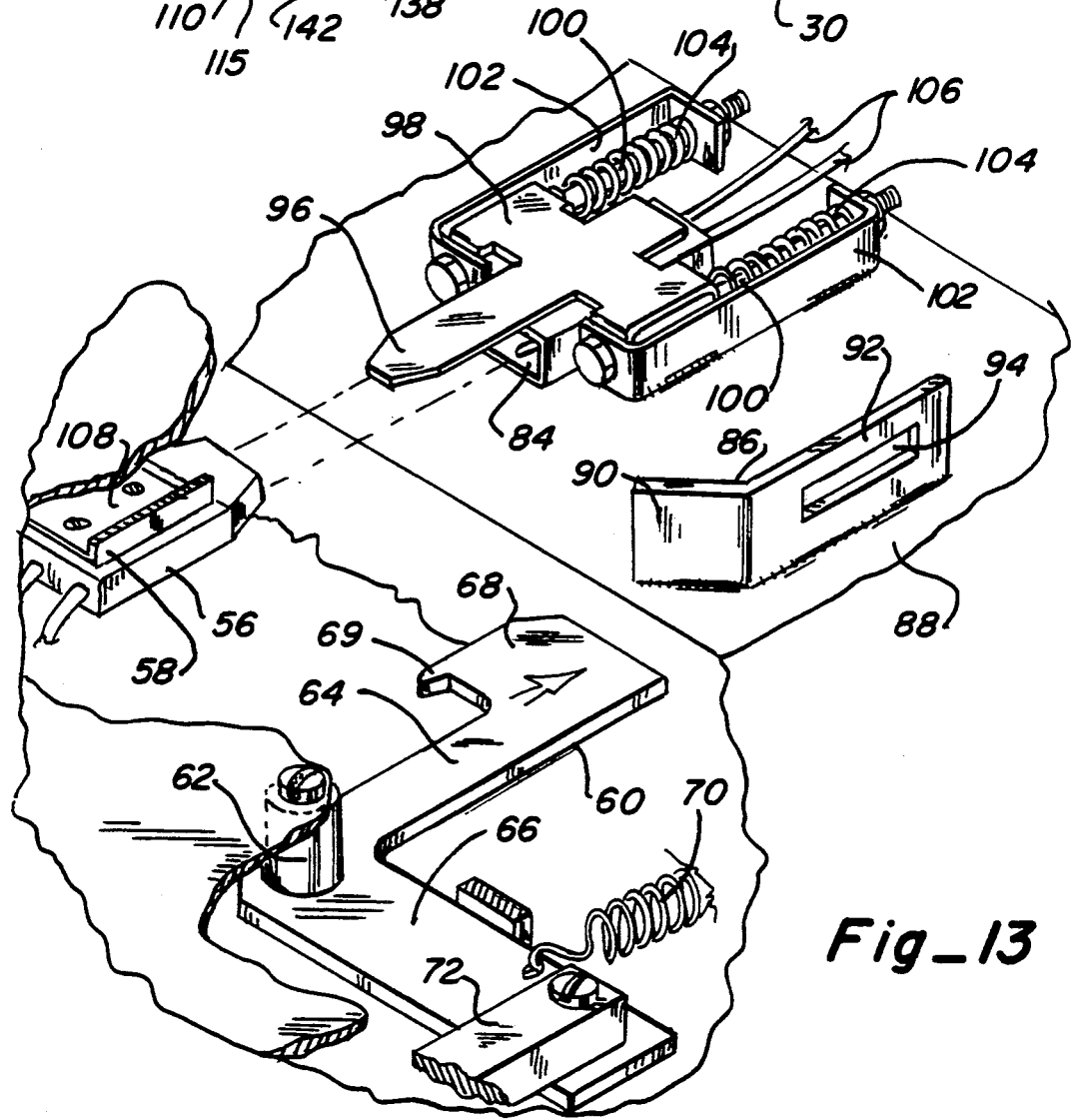

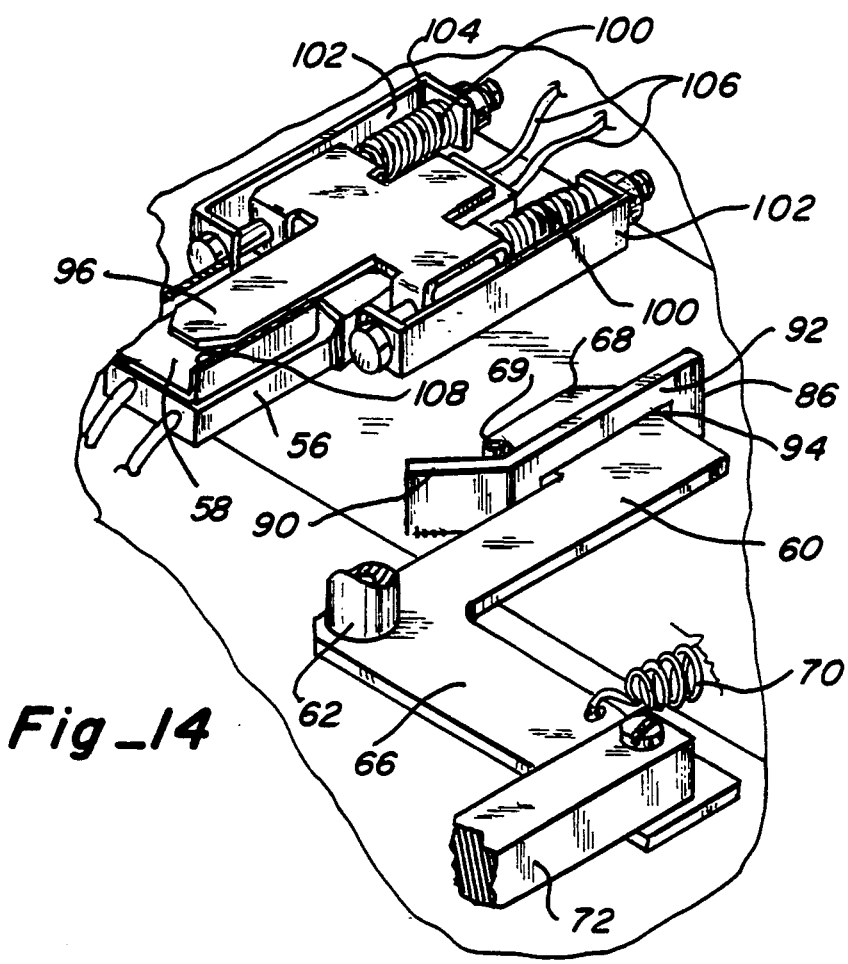
Fig_14
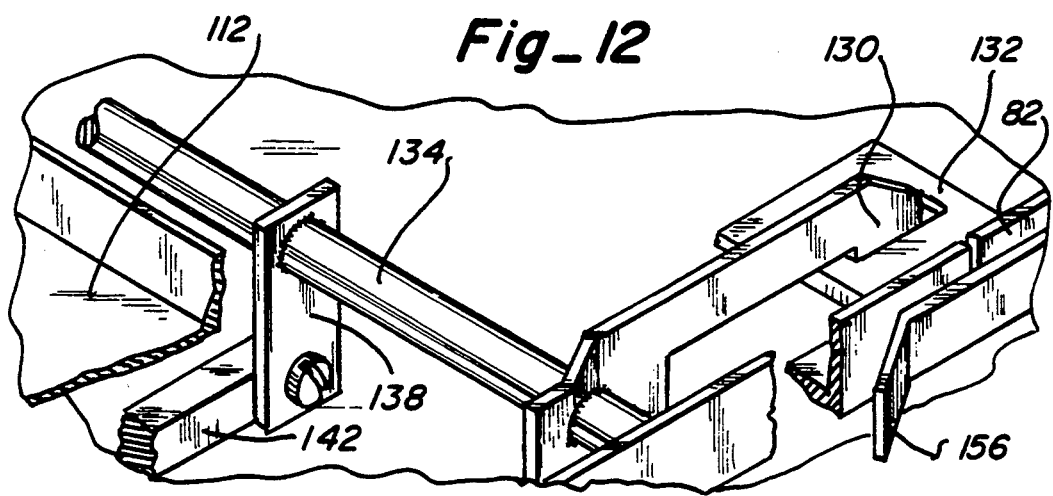
Fig_12

BATTERY TRANSFER TECHNIQUE FOR VEHICLE

This invention relates to transferring a battery or battery pack to and from a battery-powered vehicle. More particularly, this invention relates to new and improved apparatus and methodology for transferring a battery or battery pack between a battery-powered vehicle and a cart used in transporting the battery or battery pack to and from the vehicle.

Background of the Invention

Battery-powered vehicles have been used for many different applications for many years. Battery-powered trolleys and rail cars were employed for public transportation in the late 1800's. More recently battery power has been used advantageously for vehicles operating in enclosed spaces, such as in factories, warehouses, airports, malls and tunnels connecting building complexes. Battery powered vehicles, such as golf carts and other similar vehicles, are used to transport people inside. Fork lifts are frequently battery powered because they are used in enclosed spaces where the exhaust of an internal combustion engine would be dangerous to people. A resurgence of interest in battery powered personal transportation vehicles has occurred recently, due in part to rising prices of petrochemical fuels and environmental concerns over the air pollutants carried in the exhaust of internal combustion engines. Batteries are also used extensively to power smaller walk behind or remote controlled vehicles operated inside buildings and on the grounds surrounding buildings. For example, robotic inventory picking machines and cleaning machines, such as automatic floor scrubbers and polishers, are powered by batteries.

In many inside applications battery power is preferred because the vehicle moves over longer distances or through complex maneuvers, thereby making it impractical or impossible for an electrical extension cord to supply electrical energy to the vehicle. However, despite the advantage of avoiding the use of an electrical extension cord, batteries currently available have a relatively low energy storage capacity and a relatively high weight compared to the energy storage capacity. Consequently, the batteries need to be recharged on a relatively frequent basis. In general, charging the battery pack takes a longer time period to accomplish than the time required to discharge the battery during use. Since the vehicle would not be available for use if the batteries are recharged while in the vehicle, removable battery packs are sometimes used. Once the battery pack has been discharged from use, the discharged battery pack is removed and a freshly charged battery pack is substituted. Use of the vehicle with the fresh battery pack can be continued while the discharged battery pack is recharged. In this manner, removable battery packs allow the use of the vehicle to be maintained without regard to the rate at which electricity is consumed.

Safety and convenience are some of the concerns associated with using removable battery packs. Even though a battery pack is discharged sufficiently to prevent effective use of the vehicle which it powers, there is still sufficient electrical energy stored in the battery to cause a fire or burn if the electrical conductors to the battery pack are mistakenly or poorly connected. Damage to the vehicle, its equipment and its operator may result from mistakes during battery pack disconnection and connection while transferring the battery packs. In addition batteries are relatively heavy and a considerable number of them are usually connected together in the battery pack to obtain a significant energy storage capability. Battery packs formed by three to eight batteries are not uncommon, each battery weighing in the neighborhood of one hundred to one hundred fifty pounds. Consequently the weight of the heavy and relatively large battery packs can pose difficulties in removing the packs from the vehicle, as well as safety. If the battery pack should fall on or press against the person attempting to transfer the pack, there is a potential for significant personal injury or damage to the batteries and other equipment.

These and other problems associated with transferring battery packs has resulted in the development of moveable platforms upon which to place the batteries of the pack. U.S. Pat. No. 417,259 for "Electrically Propelled Vehicle" discloses a cart which is wheeled next to an electrically powered street car to remove spent batteries from and load freshly charged batteries onto the street car. U.S. Pat. No. 384,562 for "Electric Railway" discloses a cart to be rolled up perpendicularly to a battery-powered rail car, so that batteries can be transferred to and from the rail car.

The problems associated with transferring battery packs in walk-behind, human controlled vehicles, such a floor scrubbers and cleaning equipment, may be especially confounded for a number of different reasons. First, a single operator is usually expected to make the transfer without help from others, because the single operator is controlling the vehicle and transferring the battery pack is an expected part of the job. Second, such vehicles such a floor scrubbers generally have the operating components closely packed and organized in the machine to save space and to maximize the amount of space available for other components, such as tanks for the cleaning solution and for the used and dirty cleaning fluid removed from the floor. Because of this compact arrangement of the components, access by the operator to the battery pack becomes more difficult. Injury to the operator or to the equipment can occur during transfer of the battery pack if the vehicle moves unexpectedly and the battery pack falls or presses against the operator. Other concerns and difficulties associated with removable battery packs in vehicles are also known and appreciated.

It is against this and other background information that the following significant improvements and advancements have taken place in the field of vehicles using transferrable battery packs.

SUMMARY OF THE INVENTION

In general, the ease and safety of transferring a battery pack to and from battery powered vehicles has been improved by the apparatus and method of the present invention.

A significant aspect of the present invention relates to a tray supporting the battery pack which automatically locks to a cart for transporting the batteries to and from a battery powered vehicle. Upon manually unlocking the tray from the cart, the tray is transferred to the vehicle and is automatically locked to the vehicle. Upon manually unlocking the tray from the vehicle, the tray is transferred from the vehicle to the cart.

Another significant aspect of the present invention relates to automatically attaching the cart to the vehicle in a position to accomplish the transfer. The automatic attachment of the cart to the vehicle prevents the tray and the battery pack from falling during the transfer due to unanticipated relative movement of the cart and the vehicle.

Another significant aspect of the present invention relates to automatically engaging portions of an electrical connector on the tray and the battery powered vehicle when the tray is moved on the vehicle, and automatically disconnecting the electrical connector when the tray is moved onto the cart. The electrical continuity of the electrical connection is maintained by biasing the portions of the electrical connector together.

A further significant aspect of the present invention relates to a method of transferring the battery pack to a vehicle by automatically locking the tray to the cart, automatically attaching the cart to the vehicle, moving the tray to the vehicle, and automatically locking the tray to the vehicle. In addition the electrical connection is automatically established. The connections of the tray to the vehicle and the tray to the cart are preferably manually unlocked. Similarly the attachment of the cart to the vehicle is also preferably manually detached.

More complete appreciation of the present invention and its scope can be obtained from understanding the accompanying drawings, which are briefly summarized below, the following detailed description of the presently preferred embodiments of the invention, and the appended claims.

BRIEF DESCRIPTION OF THE DRAWINGS

FIG. 1 is a perspective view of a walk-behind, hand-controlled, battery-powered floor cleaning vehicle which incorporates the present invention.

FIG. 2 is a perspective view of a cart and a tray containing a battery pack being transferred the cart and the vehicle shown in FIG. 1, with an access door of the vehicle in a open position.

FIG. 3 is a side view of the cart shown in FIG. 2, with the tray containing batteries positioned fully on the cart.

FIG. 4 is a partial side elevational view of the vehicle shown in FIG. 1, with a portion broken out to illustrate the tray and the battery pack on the tray positioned within the vehicle.

FIG. 5 is a bottom plan view of the tray viewed substantially from the plane of line 5—5 of FIG. 3.

FIG. 6 is a section view of the cart taken substantially in the plane of line 6—6 of FIG. 3.

FIG. 7 is a partial sectional view of a frame of the vehicle upon which the tray rests in the interior of the vehicle, taken substantially in the plane of line 7—7 of FIG. 4.

FIG. 8 is a perspective view of the cart and the tray as shown in FIGS. 2 and 3, with the tray positioned on the cart and the battery pack shown in phantom by dashed lines.

FIG. 9 is an enlarged section view taken substantially in the plane of line 9—9 in FIG. 3.

FIG. 10 is a partial enlarged section view taken substantially in the plane of line 10—10 of FIG. 1, illustrating the frame of the vehicle, the tray resting on the frame of the vehicle and the battery pack positioned on the tray.

FIG. 11 is an enlarged partial section view taken substantially in the plane of line 11—11 of FIG. 2, illustrating a mechanical connection between the cart and the frame of the vehicle during transfer of the tray and the battery pack, and also illustrating the alignment of an electrical connection occurring when the cart is positioned in the vehicle.

FIG. 12 is a partial perspective view of a locking mechanism between the cart and the vehicle by which to accomplish the connection shown in FIG. 11.

FIGS. 13 and 14 are partial perspective views of the electrical connectors on the tray and the frame of the vehicle and of a locking mechanism operative between the cart and the vehicle, showing the conditions of these elements when the tray is disconnected from the vehicle as shown in FIG. 11 and when the tray is connected to the vehicle as shown in FIG. 4, respectively.

DETAILED DESCRIPTION

The present invention is advantageously incorporated in a self-propelled, walk-behind, human-controlled floor scrubbing vehicle 20 shown in FIG. 1, although the invention can be applied to a wide variety of different types of vehicles. The vehicle 20 is guided and controlled by an operator (not shown) grasping a handle 22 and manipulating controls 24 to guide the vehicle while walking behind it. An outer cover 26 encloses many of the internal components of the vehicle 20 such as a battery pack 28 (FIG. 4) which supplies energy to electric motors (not shown) that create the motive force to achieve the functions of the vehicle. For example, electric motors drive wheels 30 to propel the vehicle 20, operate fluid pumps (not shown) to transfer cleaning fluid from a tank 32 to the floor, move cleaning brushes 34 to scrub the floor, and operate other fluid pumps to suction the dirty used fluid from the floor at a pick up housing 36 and deliver it to a holding tank 37. The tanks 32 and 37 are preferably formed internally as a part of the cover 26. The cover 26 also includes a door 38 which is opened to expose the battery pack 28 and to allow the battery pack to be transferred to and from the vehicle.

A number, typically three or six, of individual batteries 40 are electrically interconnected in an appropriate manner by electrical conductor wires 42 to form the battery pack 28. The batteries 40 of the pack 28 are supported on a large flat plate member 46 of the tray 44, as is shown in FIGS. 5, 8, 9 and 10. A rim 48 extends upward from the periphery of the plate member 46 and confines the batteries 40 on the plate member 46 of the tray 44. Although not shown, a thin plastic liner may be placed in the tray 44 upon which the batteries rest.

In order to facilitate movement of the battery pack 28, the tray 44 is mounted on wheels or rollers 50 which are connected to the bottom of the plate member 46, as is shown in FIGS. 5, 9 and 10. Downward opening U-shaped channel members 52 are connected to the bottom surface of the plate member 46, preferably by welding, and the rollers are positioned within the U-shaped channel by axle bolts 54. One mating portion 56 of an electrical connector is also attached to the bottom surface of the plate member 46, as is shown in FIGS. 5, 13 and 14. A U-shaped mounting bracket 58 connects the mating portion 56 of the connector to the plate member 46. The wires 42 extend from the battery pack 28 around a rear end of the tray 44 to the mating portion 56 of the electrical connector. It is through the mating portion 56 of the electrical connector that the battery pack delivers current to the vehicle or receives a charging current from a battery charger (not shown).

Elements of a tray locking means or mechanism are also connected to the bottom surface of the plate member 46, as are shown in FIGS. 5, 8, 9, 10, 13 and 14. The tray locking elements include a L-shaped latch member 60 which is pivotally connected by a shaft 62 extending from the plate member 46. The latch member 60 includes a first latching leg 64 which extends generally at a right angle from a second operating leg 66. The latching leg 64 includes a protrusion 68 extending to the side thereby forming the latching leg in the form of a hook shape. A locking tab 69 extends from the protrusion 68 toward the operating leg 66. A spring 70 is connected to the second leg 66 to bias the latch member 60 in a clockwise position as is shown in FIG. 5. A front end of a elongated shaft 72 is also connected to the second leg 66. The shaft 72 extends along the bottom surface of the plate member 46 to a release handle 74 connected at the rear end of the shaft 72. A support bracket 76 supports the shaft 72 near its rear end. The handle 74 extends slightly beyond the rear end of the tray 44 to be accessible to be pulled rearwardly by the operator. Rearward movement of the support handle 74 and the shaft 72 is applied to the operating leg 66 to pivot the latch member 60 in a counterclockwise manner (as shown in FIG. 5), against the bias force of the spring 70. A limit bracket 78 contacts the leg 66 and restricts the extent of pivoting movement of the latching member 60.

The other elements of the tray locking mechanism are located on the vehicle 20 and on a cart 80 between which the tray 44 and the battery pack 28 are transferred as is shown in FIG. 2. The pivoting movement of the latch member 60 establishes a locked connection of the tray 44 to the vehicle 20 or to the cart 80 and also disconnects the tray 44 from the vehicle 20 or from the cart 80 to accomplish the transfer of the battery pack 28.

The tray 44 is supported in the vehicle 20 on a pair of transversely spaced parallel L-shaped rails 82 which form part of a support frame for the vehicle 20, as is shown in FIGS. 7 and 10. The rails 82 extend to the front of an interior opening into which the tray and battery pack 28 are received when the door 38 (FIG. 2) is opened. The rollers 50 contact and rest on the rails 82. Lateral or transverse movement of the tray in the vehicle is prevented by the sides of the rails 82 positioned to the outside of the rollers 50. Forward and reverse movement of the tray 44 on the rails 82 is prevented by the tray locking mechanism. When the tray is locked in position in the vehicle 20, the mating portion 56 of the electrical connector connects with another mating portion 84 of the electrical connector which is connected to the vehicle 20 as is shown in FIG. 11.

A flange 86 is the primary element of the tray locking mechanism attached to the vehicle 20, as is shown in FIGS. 7, 13 and 14. The flange 86 is connected to a cross member 88 of the support frame of the vehicle, preferably by welding, and extends upward from the cross member. The cross member 88 extends between the rails 82. The flange 86 includes a flared end 90 and a main portion 92. The main portion 92 extends generally parallel to the rails 82 and has a slot 94 formed therein. The flared end 90 extends at an angle to the rails 82 and contacts the protrusion 68 of the latching leg 64 of the L-shaped latch member 60 when the tray 44 moves forward into the vehicle on the rails 82. The flared end 90 pivots the latch member 60 against the bias force of the spring 70 and directs the protrusion 68 into the slot 94, as is shown in FIG. 14. With the protrusion 68 located in the slot 94 the tray is restrained against forward and rearward movement in the vehicle. The locking tab 69 prevents the latch member 60 from unintentionally pivoting and withdrawing the protrusion 68 from the slot 94. To release the tray for movement out of the vehicle, the handle 74 (FIG. 5) is pulled to pivot the latch member 60 and remove the protrusion 68 and locking tab 69 from within the slot 94, thereby releasing the tray to be removed from the vehicle.

Simultaneously with the engagement of the latch member 60 into the slot 94 of the flange 86, the electrical connector mating portion 56 mounted on the tray mates with a electrical connector mating portion 84 mounted on the cross member 88 of the vehicle, as is apparent from FIGS. 13 and 14. Alignment of the mating portions 56 and 84 to achieve the electrical and mechanical connection is established by a bayonet 96. The bayonet 96 extends rearward from a support housing 98 which is slidably mounted on a pair of parallel rods 100. The rods 100 are each connected to a support bracket 102, and each support bracket is connected to the cross member 88, preferably by welding. Springs 104 encircle the rods 100 and create a biasing force which urges the bayonet 96 and the support housing 98 rearwardly. The electrical connector mating portion 84 is connected to the support housing 98, and thereby moves with the support housing 98 and the bayonet 96 along the rods 100. Electrical conductors 106 extend from the mating portion 84 to the motors and other control equipment of the vehicle.

As the tray 44 moves into the position where it will be locked to the vehicle, as is shown in FIG. 13, the bayonet 96 extends into the open space 108 enclosed by the U-shaped mounting bracket 58 for the connector mating portion 56 on the tray. The insertion of the bayonet 96 into the open space 108 guides the mating portions 56 and 84 of the electrical connector into alignment with one another to establish an electrical connection. Should there be any slight misalignment as the tray moves into the vehicle, the insertion of the bayonet 96 into the open space 108 of the bracket 58 applies a slight lateral correction force on the tray to achieve the proper alignment.

The bias force from the springs 104 is transferred through the support housing 98 to the electrical connector mating portion 84 to force it into good electrical contact with the mating portion 56. Without the constant bias force from the springs 104 on the electrical connector mating portions 56 and 84, the electrical connection might be broken intermittently from the vibrations and movement occurring during use of the vehicle as it travels about. The electrical connection is also maintained despite the possibility of slight flexing of the support frame of the vehicle during use.

Details regarding the cart 80 and its use in transferring the battery pack 28 are shown in FIGS. 2, 3, 4, 6, 8 and 9. The cart 80 includes a generally rectangular frame structure which is formed by a pair of L-shaped side rails 110. A front cross plate 112 and a rear cross plate 114 extend transversely between the side rails and are rigidly connected to the side rails, preferably by welding. The cross plates 112 and 114 maintain the side rails 110 in a parallel orientation to form the generally rectangular frame structure of the cart 80. Caster wheels 115 are connected to the cross plates 112 and 114 and these caster wheels 115 support the cart to allow it to be moved. A bar 116 is connected, preferably by welding, to the rear cross plate 114. The bar 116 extends upward from the rear cross plate 114 to a handle 118. The operator may grip the handle 118 to manipulate the cart 80 on its caster wheels 115.

The side rails 110 receive and support the rollers 50 of the tray 44 when the tray is on the cart, as is shown in FIG. 9. Portions of the L-shaped side rails 110 are located to the outside of the rollers 50 to prevent the tray from slipping laterally off of the side of the cart 80. The tray is prevented from moving forward and backward off of the cart by elements of the locking mechanism which are also incorporated as a part of the cart 80.

The tray locking mechanism on the cart 80 includes a flange 120 which is connected to the front cross plate 112, preferably by welding, as is shown in FIGS. 6 and 8. The flange 120 extends above the cross plate 112 and is generally of the same shape and character as the flange 86 (FIGS. 7 and 13) connected to the frame of the vehicle. However, the flange 120 on the cart 80 has a flared end 122 facing in the forward direction, while the flange on the vehicle has its flared end 90 facing in the rearward direction (FIG. 7). A slot 124 is formed in a forward extending portion 126 of the flange 120, and the flared end 122 and the slot 124 is positioned to interact with the protrusion 68 formed on the leg 64 of the latch member 60, when the tray 44 is rolled rearwardly onto the cart 80 as shown in FIG. 8. The interaction of the latch member 60 with the flange 120 is similar to the interaction of the latch member 60 with the flange 86 on the vehicle.

Once the protrusion 68 is located in the slot 124 as shown in FIG. 8, the tray and the battery pack 28 are prevented from moving forward and rearward on the cart 80. To release this locked connection, the handle 74 is pulled rearwardly by the operator, and this movement is transferred through the shaft 72 to the latch member 60 as can be understood from FIG. 5. The latch member pivots and withdraws the protrusion 68 from the slot 124, thereby releasing the tray for movement off of the cart 80.

To avoid accidentally dropping or tipping the battery pack 28 caused by unexpected movement of the vehicle 20 or the cart 80 during the transfer, the cart 80 includes an attachment means or mechanism. The attachment mechanism allows the operator to selectively and temporarily attach the cart 80 to the vehicle in a position with the frame rails 82 of the vehicle aligned with the side rails 110 of the cart as is shown in FIGS. 4 and 11. The attachment mechanism includes a pair of hooks 130 on the cart as is shown in FIGS. 3, 6, 8, 11 and 12 and a pair of receptacles 132 on the vehicle as shown in FIGS. 7, 10, 11 and 12. The hooks 130 fit within the receptacles 132 to connect the cart to the vehicle during the transfer of the tray and the battery pack.

The hooks 130 are rigidly attached, preferably by welding, to a shaft 134, as shown in FIGS. 6 and 12. The shaft 134 extends transversely across the front end of the cart 80. The shaft 134 is pivotally mounted to the side rails 110 of the cart by bearing blocks 136. A pivot arm 138 is connected rigidly, preferably by welding, to the shaft 134 at a position between the two hooks 130. When the hocks extend generally forward, the pivot arm 138 extends generally downward, as shown in FIGS. 11 and 12. A lever 140 is pivotably connected at a middle location 141 to the underside of the front cross plate 112 as is shown in FIGS. 6 and 9. A link member 142 connects one end of the lever 140 to the pivot arm 138. A rod 144 is connected to the other end of the lever 140, and the rod 144 extends rearwardly beyond the rear end of the cart 80. A support bracket 146 is connected to the underside of the rear cross plate 114 to support the rod 144 near the rear of the cart and allow the rod to move longitudinally along its length. A handle 148 is connected to the rear end of the rod 144 at a position slightly beyond the rear end of the cart. A spring 150 is connected between the end of the lever 140 to which the rod 144 is connected and the cross plate 112.

The spring 150 biases the lever in a clockwise direction as shown in FIG. 6. This bias force moves the rod 144 and handle 148 to a forward position. The bias force from the spring 150 is also transferred to the shaft 134 by the link member 142 and the lever 140. This bias force also moves the hooks 130 in a clockwise or downward manner as shown in FIGS. 11 and 12. The bias on the hooks 130 causes them to remain engaged in the receptacles 132 thereby inhibiting the accidental disconnection of the cart and the vehicle when the attachment mechanism is engaged.

The receptacles 132 are formed in relatively small plates 152 which are attached, preferably by welding, to the frame rails 82 of the vehicle, as shown in FIG. 7. The plates 152 are positioned near the end of the vehicle through which the tray and battery pack are inserted into the interior of the vehicle. A beveled edge 154 (FIG. 11) on the front end of the hooks 130 contacts the edge of the plates 150 and causes the hooks to pivot counterclockwise as shown in FIG. 11, as the hooks ride upward on the plates 150 when the cart 80 is moved forward into the transfer position with the vehicle. As the cart reaches the forwardmost position relative to the vehicle, the front ends of the hooks fall into the receptacles 132, thereby attaching the cart to the vehicle. Two guide members 156 are attached to the front of the frame rails 82 to contact the side rails 110 of the cart as it moves forward. The guide members 156 steer the cart and the vehicle into alignment so the attachment can be achieved with the hooks 130 positioned in the receptacles 132.

The attachment of the cart and the vehicle is released after the tray and battery pack transfer is complete. The attachment is released by the operator pulling rearwardly on the handle 148. The lever 140 pivots in response to the pulling movement, forcing the link member 142 forward and pivoting the shaft 134 and the hooks 130 in a counterclockwise manner as shown in FIGS. 11 and 12. The forward ends of the hooks 130 are withdrawn from the receptacles 132 and the operator then pulls the handle 118 of the cart rearwardly while the hooks are withdrawn from the receptacles.

Use of the apparatus of the present invention will typically proceed in the following. Initially the tray 44, loaded with the battery pack 28, is placed on the cart 80. The cart 80 is rolled on its caster wheels 115 to easily transport the relatively heavy battery pack 28 to the vehicle. The caster wheels 115 allow the cart to be easily maneuvered with the heavy battery pack in place. The locking mechanism operative between the tray and the cart maintains the tray in position on the cart during this movement, thereby avoiding the accidental dumping, dropping or release of the tray and the battery pack. The cart is directed to the vehicle 20 by the operator grasping the cart handle 118. The door 38 of the vehicle will ordinarily have been previously opened.

To avoid accidental dropping of the battery pack and the tray caused by unexpected relative movement of the cart and the vehicle, the cart is temporarily attached to the vehicle by use of the attachment mechanism. Insertion of the ends of the hooks 130 into the receptacles 132 occurs automatically as the cart 38 moves into the transfer position with the vehicle. Thereafter, the cart will remain firmly attached to the vehicle until the operator grasps pulls the handle 148 to release the attachment.

While attached, the battery pack and tray are transferred from the cart to the vehicle. To release the tray from its locked position on the cart the handle 74 is pulled by the operator, and the tray and battery pack is pushed off of the cart and into the vehicle. Smooth transfer of battery pack and tray is assured by the alignment of the frame rails of the vehicle with the side rails of the cart. As the tray rolls into position in the vehicle, the locking mechanism automatically locks the tray in position. The bayonet 96 attached to one mating portion 84 of the electrical connector is guided into the open space 108 in the support bracket 58 which is attached to the other mating portion 56 of the electrical connector. An effective electrical connection is thereby established between the batteries and the electrical system of the vehicle. The biasing force of the springs 104 maintains the electrical contact between the two mating portions 56 and 84 even under the influence of vibration, slight relative movement of the tray relative to the frame of the vehicle due to flexing as the vehicle moves over uneven surfaces, and the like.

Once the vehicle is loaded with the battery pack, the cart 38 is detached from the vehicle by the operator grasping and pulling the handle 148, which causes the hooks to retract from their position in the receptacles. Thereafter, the cart 38 is moved away, the door of the vehicle is closed, and the vehicle is safely operated. The procedures described are reversed when unloading a tray with a discharged battery pack from the vehicle.

The locking mechanism establishes an automatic connection of the tray to the vehicle when the tray is transferred to the vehicle and establishes an automatic connection of the tray to the cart when the tray is transferred to the cart. This simplifies the transfer process and makes it easier and safer because the operator is not required to take affirmative action to secure the tray after the transfer is complete. On the other hand affirmative action by the operator is required to release the tray from the cart or the vehicle by pulling on the handle 74 in both cases. By requiring the operator to perform an affirmative action to release the tray, the operator should be consciously aware that the cart and the vehicle are in the proper and safe positions to accomplish the transfer. Similarly, the attachment mechanism automatically attaches the cart and the vehicle, but an affirmative act by the operator is required to release the attachment. Again the operator should be consciously aware of when it is safe and proper to release the attachment of the cart and the vehicle, and consequently the risk of accidentally dropping the battery pack should be reduced. All of the handles for controlling the locking mechanisms both on the cart and in the vehicle and for controlling the attachment mechanism are on the rear of the cart and on the tray for easy access by the operator.

A presently preferred embodiment of the present invention and many of its improvements have been described with a degree of particularity. The previous description is of the preferred example for implementing the invention, but the scope of the invention should not necessarily be limited by this description. The scope of the present invention is defined by following claims.

The invention claimed is:

1. Apparatus for transferring a battery pack to and from a battery powered vehicle, comprising:

a tray adapted for supporting the battery pack, the tray including rollers upon which to move the tray;

a support frame located in the vehicle for supporting the tray with the battery pack supported on the tray;

a cart having a structure for supporting the tray with the battery pack supported on the tray, the cart also having wheels upon which to move the cart into a predetermined transfer position relative to the vehicle in which the tray supporting structure of the cart aligns with the tray supporting support frame of the vehicle to accomodate movement of the tray on the rollers between the vehicle and the cart to accomplish transfer of the battery pack between the vehicle and the cart; and automatic locking means operative between the tray, the cart and the support frame, the locking means automatically locking the tray in a first predetermined fixed position on the cart upon and as a result of movement of the tray on the rollers to the first predetermined position on the cart during transfer of the battery pack to the cart, the locking means further automatically locking the tray in a second predetermined fixed position on the support frame upon and as a result of movement of the tray on the rollers to the second predetermined position on the support frame during transfer of the battery pack to the vehicle.

2. Apparatus as defined in claim 1, wherein:

the locking means further comprises means for manually unlocking the tray from the first predetermined position on the cart after locking has been automatically established and for manually unlocking tray in the second predetermined position on the support frame after locking has been automatically established.

3. Apparatus as defined in claim 1, wherein the locking means comprises:

a latching member connected to the tray;

a first latch receiving member connected to the cart for connecting with the latching member to establish the lock of the tray to the cart; and a second latch receiving member connected to the support frame for connecting with the latching member to establish the lock of the tray to the support frame.

4. Apparatus as defined in claim 3, wherein:

the first and second latch receiving members are of essentially the same configuration.

5. Apparatus as defined in claim 1, further comprising:

attaching means connected to the cart and the support frame for automatically attaching the cart to the support frame upon movement of the cart on the wheels to the predetermined transfer position relative to the support frame by which to transfer the tray and the supported battery pack between the vehicle and the cart.

6. Apparatus as defined in claim 5, wherein:

the attaching means further comprises means for manually releasing the attachment of the cart to the vehicle after the transfer position has been automatically established.

7. Apparatus for transferring a battery pack to and from a battery powered vehicle, comprising:

a tray adapted for supporting the battery pack, the tray including rollers upon which to move the tray;

a support frame located in the vehicle for supporting the tray with the battery pack supported on the tray;

a cart having wheels upon which to move the cart, the cart including a structure for supporting the tray with the battery pack supported on the tray; and locking means operative between the tray, the cart and the support frame, the locking means automatically locking the tray in a first predetermined fixed position on the cart upon movement of the tray on the rollers to the first predetermined position on the cart during transfer of the battery pack to the cart, the locking means further automatically locking the tray in a second predetermined fixed position on the support frame upon movement of the tray on the rollers to the second predetermined position on the support frame during transfer of the battery pack to the vehicle, said locking means comprising:

a latching lever pivotably connected to the tray and operative to pivot between a first pivoted position and a second pivoted position;

latch biasing means operatively connected to the latching lever for biasing the latching lever into the first pivoted position and allowing the latching lever to move into the second pivoted position;

a cart flange connected to the structure of the cart at a position to contact the latching lever upon movement of the tray onto the cart to the first predetermined position, the cart flange including means for engaging a portion of the latching lever when the latching lever is in the first pivoted position and the tray is in the first predetermined position on the cart; and a vehicle flange connected to the support frame of the vehicle at a position to contact the latching lever upon movement of the tray to the second predetermined position, the vehicle flange including means for engaging a portion of the latching lever when the latching lever is in the first pivoted position and the tray is in the second predetermined position on the vehicle.

8. Apparatus as defined in claim 7, wherein:

at least one of the cart flange or the vehicle flange includes a tapered portion which contacts the latching lever to pivot the latching lever from the first pivoted position into the second pivoted position as the tray moves onto the cart to the first predetermined position or as the tray moves onto the support frame to the second predetermined position, respectively; and the latch biasing means moves the latching lever from the second pivoted position to the first pivoted position upon the tray reaching either of the first or second predetermined positions.

9. Apparatus as defined in claim 8, wherein:

the engaging means of the cart flange and the engaging means of the vehicle flange each include a slot in which to receive the portion of the latching lever.

10. Apparatus as defined in claim 8, further comprising:

a handle operatively connected to the latching lever to manually move the latching lever from the first pivoted position to the second pivoted position to withdraw the portion of the latching lever from the engaging means of the cart flange or the vehicle flange and release the lock of the tray to either of the cart or the support frame.

11. Apparatus for transferring a battery pack to and from a battery powered vehicle, comprising:

a tray adapted for supporting the battery pack, the tray including rollers upon which to move the tray;

a support frame located in the vehicle for supporting the tray with the battery pack supported on the tray;

a cart having wheels upon which to move the cart, the cart including a structure for supporting the tray with the battery pack supported on the tray;

locking means operative between the tray, the cart and the support frame, the locking means automatically locking the tray in a first predetermined fixed position on the cart upon movement of the tray on the rollers to the first predetermined position on the cart during transfer of the battery pack to the cart, the locking means further automatically locking the tray in a second predetermined fixed position on the support frame upon movement of the tray on the rollers to the second predetermined position on the support frame during transfer of the battery pack to the vehicle; and attaching means connected to the cart and the support frame for automatically attaching the cart to the support frame upon movement of the cart on the wheels to a predetermined transfer position relative to the support frame by which to transfer the tray and the supported battery pack between the vehicle and the cart, said attaching means comprising:

a hook member pivotably connected to the cart to move between a first predetermined pivoted position and a second predetermined pivoted position, the hook member connected to the cart to project forwardly from the cart;

hook biasing means operatively connected to the hook member for biasing the hook member into the first pivoted position and allowing the hook member to move into the second pivoted position; and an attachment member connected to the support structure of the vehicle at a position to contact and engage with the hook member upon movement of the cart to the transfer position, the attachment member including means for engaging a portion of the hook member when the hook member is in the first pivoted position and the cart is in the transfer position relative to the vehicle.

12. Apparatus as defined in claim 11, wherein:

at least one of the hook member or the attachment member includes a tapered portion which contacts the hook member to pivot the hook member from the first pivoted position into the second pivoted position as the cart moves to the transfer position relative to the vehicle; and the hook biasing means moves the latching lever from the second pivoted position upon the cart reaching the transfer position.

13. Apparatus as defined in claim 12, wherein:

the engaging means of attachment member includes a slot in which to receive the portion of the hook member.

14. Apparatus as defined in claim 12, further comprising:

a handle operatively connected to the hook member by which to manually move the hook member from the first pivoted position to the second pivoted position to withdraw the portion of the hook member from the engaging means and release the attachment of the cart in the transfer position to the tray.

15. Apparatus as defined in claim 11, further comprising:
a pivot shaft extending transversely across the cart at a front end of the cart;
a pair of hook members, the hook members attached to the shaft at spaced apart transverse positions; and
a pair of attachment members, the attachment members attached to the support frame in spaced apart transverse positions to engage each of the hook members with an attachment member.

16. Apparatus as defined in claim 11, wherein:
the structure includes cart rails upon which the rollers of the tray roll when the tray moves into the first predetermined position;
the support frame includes vehicle rails upon which the rolers of the tray roll when the tray moves into the second predetermined position; and wherein:
the predetermined transfer position aligns the cart rails and the vehicle rails.

17. Apparatus for transferring a battery pack to and from a battery powered vehicle, comprising:
a tray adapted for supporting the battery pack, the tray including rollers upon which to move the tray;
a support frame located in the vehicle for supporting the tray with the battery pack supported on the tray;
a cart having wheels upon which to move the cart, the cart including a structure for supporting the tray with the battery pack supported on the tray;
locking means operative between the tray, the cart and the support frame, the locking means automatically locking the tray in a first predetermined fixed position on the cart upon movement of the tray on the rollers to the first predetermined position on the cart during transfer of the battery pack to the cart, the locking means further automatically locking the tray in a second predetermined fixed position on the support frame upon movement of the tray on the rollers to the second predetermined position on the support frame during transfer of the battery pack to the vehicle;
an electrical connection operative between the tray and the vehicle for establishing electrical connectivity between the battery pack and the vehicle when the tray is in the second position, the electrical connection including:
a first connector portion connected to the structure and adapted to be electrically connected to the battery pack; and
a second connector portion connected to the support frame and adapted for engaging the first connector portion in a mating engagement to establish the electrical connection, the first and second connector portions positioned to engage in the mating engagement upon the tray moving to the second position on the support frame; and
means connected to both the first and second connector portions for automatically steering the connector portions into the mating engagement upon the tray moving to the second position on the support frame.

18. Apparatus for transferring a battery pack to and from a battery powered vehicle, comprising:
a tray adapted for supporting the battery pack, the tray including rollers upon which to move the tray;
a support frame located in the vehicle for supporting the tray with the battery pack supported on the tray;
a cart having wheels upon which to move the cart, the cart including a structure for supporting the tray with the battery pack supported on the tray;
locking means operative between the tray, the cart and the support frame, the locking means automatically locking the tray in a first predetermined fixed position on the cart upon movement of the tray on the rollers to the first predetermined position on the cart during transfer of the battery pack to the cart, the locking means further automatically locking the tray in a second predetermined fixed position on the support frame upon movement of the tray on the rollers to the second predetermined position on the support frame during transfer of the battery pack to the vehicle;
an electrical connection operative between the tray and the vehicle for establishing electrical connectivity between the battery pack and the vehicle when the tray is in the second position, the electrical connection including:
a first connector portion connected to the structure and adapted to be electrically connected to the battery pack; and
a second connector portion connected to the support frame and adapted for engaging the first connector portion in a mating engagement to establish the electrical connection, the first and second connector portions positioned to engage in the mating engagement upon the tray moving to the second position on the support frame; and
means connected to both the first and second connector portions for automatically steering the connector portions into the mating engagement upon the tray moving to the second position on the support frame, said automatic steering means comprising:
a support housing to which the second connector portion is connected, the support housing movably connected to the support frame to move between a rearward position and a forward position;
a bayonet connected to the support housing and projecting in a rearward position toward the cart when the cart is in a predetermined position to transfer the tray from the cart to the vehicle;
connector biasing means connected to the support housing to bias the support housing, the bayonet and the second electrical connector to the rearward position and to allow the support housing, the bayonet and the second electrical connector to yield to the forward position; and
a support bracket connecting the first connector portion to the tray, the support bracket including receiving means for receiving the bayonet upon movement of the tray into the second position on the support member, the receipt of the bayonet in the receiving means guiding the first connector portion into the mating engagement with the second connector portion, and the connector biasing means applying engaging force between the first and second connection portions to maintain electrical continuity in the mating engagement.

19. Apparatus as defined in claim 18, further comprising:

a rod upon which the support housing is slidably mounted; and wherein:

the connector biasing means comprises a spring encircling the rod to bias the support housing to the forward position.

20. Apparatus for transferring a battery pack to and from a battery powered vehicle, comprising:

a tray adapted for supporting the battery pack, the tray including rollers upon which to move the tray;

a support frame located in the vehicle for supporting the tray with the battery pack supported on the tray;

a cart having wheels upon which to move the cart, the cart including a structure for supporting the tray with the battery pack supported on the tray; and attaching means connected to the cart and the support frame for automatically attaching the cart to the support frame upon movement of the cart on the wheels to a predetermined transfer position relative to the support frame, the transfer position allowing the transfer of the tray and the supported battery pack between the vehicle and the cart, said attaching means comprising:

a hook member pivotably connected to move between a first predetermined pivoted position and a second predetermined pivoted position, the hook member connected to the cart to project forwardly from the cart;

hook biasing means operatively connected to the hook member for biasing the hook member into the first pivoted position and allowing the hook member to move into the second pivoted position; and an attachment member connected to the support structure of the vehicle at a position to contact and engage with the hook member upon movement of the cart to the transfer position, the attachment member including means for engaging a portion of the hook member when the hook member is in the first pivoted position and the cart is in the transfer position relative to the vehicle.

21. Apparatus as defined in claim 20, wherein:

the attaching means further comprises means for manually releasing the attachment of the cart to the vehicle after the transfer position has been automatically established.

22. Apparatus for transferring a battery pack to and from a battery powered vehicle, comprising:

a tray adapted for supporting the battery pack, the tray including rollers upon which to move the tray;

a support frame located in the vehicle for supporting the tray with the battery pack supported on the tray;

a cart having wheels upon which to move the cart, the cart including a structure for supporting the tray with the battery pack supported on the tray;

an electrical connection operative between the tray and the vehicle for establishing electrical connectivity between the battery pack and the vehicle when the tray is on the support frame in the vehicle, the electrical connection including:

a first connector portion connected to the structure and adapted to be electrically connected to the battery pack; and a second connector portion connected to the support frame and adapted for engaging the first connector portion in a mating engagement to establish the electrical connection, the first and second connector portions positioned to engage in the mating engagement upon the tray moving onto the support frame; and means connected to both the first and second connector portions for automatically steering the connector portions into the mating engagement upon the tray moving onto the support frame.

23. Apparatus as defined in claim 22, wherein the automatically steering means further comprises:

a support housing to which the second connector portion is connected, the support housing movably connected to the support frame to move between a rearward position and a forward position;

a bayonet connected to the support housing and projecting in a rearward position toward the cart when the cart is in a predetermined position to transfer the tray from the cart to the vehicle;

connector biasing means connected to support housing to bias the support housing, the bayonet and the second electrical connector to a rearward position and to allow the support housing, the bayonet and the second electrical connector to yield to the forward position; and a support bracket connecting the first connector portion to the tray, the support bracket including receiving means for receiving the bayonet upon movement of the tray into the second position on the support member, the receipt of the bayonet in the receiving means guiding the first connector portion into the mating engagement with the second connector portion, and the connector biasing means applying engaging force between the first and second connection portions to maintain electrical continuity in the mating engagement.

24. A method for transferring a battery pack to and from a battery powered vehicle, comprising the steps of:

supporting the battery pack on a tray having rollers upon which to move the tray and the supported battery pack;

supporting the tray in a first predetermined position on a structure of a cart having wheels upon which to move the cart;

supporting the tray in a second predetermined position on a support frame located in the vehicle;

positioning the cart in a predetermined transfer position relative to the support frame in which the tray is transferred between the cart and the support frame;

automatically attaching the cart to the support frame upon movement of the cart to the predetermined transfer position;

automatically locking the tray in the first predetermined position on the cart upon movement of the tray on the rollers to the first predetermined position on the cart during transfer of the tray to the cart; and automatically locking the tray in a second predetermined position on the support frame upon movement of the tray on the rollers to the second predetermined position on the support frame during transfer of the battery pack to the vehicle.

25. A method as defined in claim 24 further comprising the steps of:

manually releasing the lock of the cart in the first predetermined position on the tray after the lock has been automatically established;

manually releasing the lock of the cart in the second predetermined position on the support frame after the lock has been automatically established; and manually releasing the attachment of the cart to the vehicle after the transfer position has been automatically established and the tray has been transferred between the cart and the support frame.

* * * * *